(12) United States Patent
Shishikura

(10) Patent No.: US 7,665,795 B2
(45) Date of Patent: Feb. 23, 2010

(54) SIDE-UNDER SPOILER

(75) Inventor: Yasuyuki Shishikura, Niiza (JP)

(73) Assignee: Honda Access Corporation, Niiza-shi (JP)

( * ) Notice: Subject to any disclaimer, the term of this patent is extended or adjusted under 35 U.S.C. 154(b) by 334 days.

(21) Appl. No.: 11/491,876

(22) Filed: Jul. 25, 2006

(65) Prior Publication Data

US 2007/0024086 A1    Feb. 1, 2007

(30) Foreign Application Priority Data

Jul. 26, 2005   (JP) .............................. 2005-215201

(51) Int. Cl.
*B60J 9/04*        (2006.01)

(52) U.S. Cl. ................................. 296/180.1

(58) Field of Classification Search ... 296/180.1–180.5, 296/209, 1.08; 52/716.5, 716.6, 716.7
See application file for complete search history.

(56) References Cited

U.S. PATENT DOCUMENTS

| | | | | |
|---|---|---|---|---|
| 3,703,747 | A * | 11/1972 | Hamman | 24/289 |
| 3,856,194 | A * | 12/1974 | Helm | 224/326 |
| 4,011,635 | A * | 3/1977 | Meyer | 24/293 |
| 4,709,525 | A * | 12/1987 | Adell | 52/716.6 |
| 4,869,937 | A * | 9/1989 | Nagata et al. | 428/31 |
| 4,878,273 | A * | 11/1989 | West et al. | 24/289 |
| 5,353,571 | A * | 10/1994 | Berdan et al. | 52/716.5 |
| 5,783,020 | A * | 7/1998 | Kress | 156/291 |
| 6,505,448 | B2 * | 1/2003 | Ito | 52/474 |
| 7,144,075 | B2 * | 12/2006 | Shishikura | 296/209 |
| 2002/0043041 | A1 * | 4/2002 | Yoyasu | 52/716.5 |

FOREIGN PATENT DOCUMENTS

| | | |
|---|---|---|
| FR | 2 747 087 | 10/1997 |
| GB | 2 412 633 A | 10/2005 |
| JP | 60-72749 U | 5/1985 |
| JP | 63-59082 U | 4/1988 |
| JP | 02-56745 U | 4/1990 |
| JP | 8-5872 Y 2 | 2/1996 |
| JP | 10-000998 A | 1/1998 |

OTHER PUBLICATIONS

Japanese Office Action dated May 7, 2008, issued in corresponding Japanese Patent Application No. 2005-215201 and English translation.
GB Office Action dated Oct. 2, 2006, Application No. GB0614861.3.

* cited by examiner

*Primary Examiner*—H Gutman
(74) *Attorney, Agent, or Firm*—Westerman, Hattori, Daniels & Adrian, LLP

(57) ABSTRACT

A side-under spoiler insuring an excellent workability at the time of attaching a side-under spoiler to a lower side of a vehicle body via a bracket. A side-under spoiler 1 is supported by a vehicle body 2 via a bracket 3 provided at a lower side of the vehicle body 2. The side-under spoiler 1 includes a side-under spoiler body 7 supported at the lower part of the bracket 3 by supporting sections 5 of the bracket 3 elongated in the front-to-rear direction of the vehicle body 2; attaching sections 6 for engaging the side-under spoiler body 7 with the supporting sections 7; and guides 7 fir the attaching section 6 to the supporting sections 5.

6 Claims, 14 Drawing Sheets

SIDE-UNDER SPOILER

BACKGROUND OF THE INVENTION

1. Field of the Invention

The present invention relates to a side-under spoiler supported by a vehicle body through a bracket provided at a lower side of the vehicle body.

2. Description of the Related Art

Conventionally, Japanese Examined Utility Model Publication No. 8-5872 discloses a side sill protector attachment structure such that a lower end of a bracket is attached to an outer side surface of the side sill of a vehicle body, and a clearance is provided between an upper end of the bracket and the side sill so that an upper end of the protector may be inserted into the clearance so as to be hung on the upper end of the bracket. According to the structure, the upper end of the bracket is formed with a bent piece formed by elongating the upper end thereof further upwardly and then bending the same outwards, while a plurality of vertically extending ribs are arranged on the inside surface of the protector at certain intervals in the front-to-rear direction of the vehicle body, each of said ribs having a latch part on an upper end thereof so that the latch part of each rib of the protector hung on the upper end of the bracket may be fastened by the bent piece of the bracket.

According to the conventional side sill protector attachment structure, the upper end of the bracket attached to the outer side surface of the side sill is formed with the bent piece, while a plurality of the vertically extending ribs are arranged on the inside surface of the protector, each of said ribs having the latch part on an upper end thereof so that the latch part of each rib of the protector hung on the upper end of the bracket is fastened by the bent piece of the bracket. Thus, even if the protector is pushed up due to an external force applied thereto, the latch part of the rib is caught in the bent piece of the bracket, and thus, disengagement of the upper edge of the protector from the side sill due to the same coming out from the clearance will not occur. Further, since the attachment structure of the invention has such a simple structure, it does not lead to increase of cost, involving little risk of impairing appearance. Besides, assembling work is simplified because what is required of a worker is just to push the components in from above, thus leading to excellent workability.

According to the above-mentioned conventional side sill protector attachment structure, however, since the lower end of the bracket is fixed to the outer side surface of the side sill of the vehicle body by spot welding, there is a problem, for example, that the workability in attaching to a vehicle body a side-under spoiler (i.e., side sill protector) via the bracket is not so good.

SUMMARY OF THE INVENTION

The present invention has been made in view of the above problems. It is, therefore, an object of the present invention to provide a side-under spoiler having an excellent workability at the time of attaching a side-under spoiler to a lower side of a vehicle body via a bracket.

To achieve the above object, a first aspect of the present invention proposes a side-under spoiler supported by a vehicle body through a bracket provided at a lower side of the vehicle body, comprising: a side-under spoiler body supported at a lower part of the bracket by supporting sections of the bracket elongated in a front-to-rear direction of the vehicle body; one or more attaching sections for engaging said side-under spoiler body to said supporting sections; and one or more guides for guiding said attaching sections to said supporting sections.

A second aspect of the present invention proposes a side-under spoiler supported by a vehicle body through a bracket provided at a lower side of the vehicle body, comprising: a side-under spoiler body supported at a lower part of the bracket by supporting sections of the bracket elongated in a front-to-rear direction of the vehicle body; one or more attaching sections for engaging said side-under spoiler body to said supporting sections; and one or more extension sections extending from said attaching section toward the vehicle body.

A third aspect of the present invention proposes a side-under spoiler supported by a vehicle body through a bracket provided at a lower side of the vehicle body, comprising: a side-under spoiler body supported at a lower part of the bracket by supporting sections of the bracket elongated in a front-to-rear direction of the vehicle body; one or more attaching sections for engaging said side-under spoiler body to said supporting sections, said attaching section being provided with a locking part engaging with a corresponding locking part provided in said supporting section.

According to the side-under spoiler of the first aspect, the side-under spoiler can be easily positioned relative to the vehicle body owing to the guide, thus enabling the improvement of workability at the time of attachment of the side-under spoiler.

According to the side-under spoiler of the second aspect, the side-under spoiler can be easily positioned to the vehicle body owing to the extension section. At the same time, when an external force toward the vehicle body acts upon the side-under spoiler, yet the extension section receives such external force by abutting to the vehicle body, thus preventing the deformation or damage of the side-under spoiler.

According to the side-under spoiler of the third aspect, the attaching section can be properly positioned to the supporting section due to the locking parts. Moreover, from the engagement of the locking parts provided in the supporting sections to those provided in the attaching sections, the worker can sense the fact that the attaching sections have engaged to predetermined positions. Furthermore, the locking parts provided in the attaching sections also function as stoppers once they are engaged with the counterparts, thus functioning to retain the side-under spoiler.

BRIEF DESCRIPTION OF THE DRAWINGS

The invention will be more readily understood by reference to the following description, taken with the accompanying drawings, in which.

DETAILED DESCRIPTION OF THE PREFERRED EMBODIMENTS

Next is a description of a first embodiment of the invention with reference to the attached drawings. In the following description, the language "front-to-rear direction" is to be understood as that defined with reference to the vehicle. Moreover, language "front side" is to be understood as a near side as seen from a worker when attaching a side-under spoiler, while "rear side" as a far side when attaching a side-under spoiler.

Figure 1:
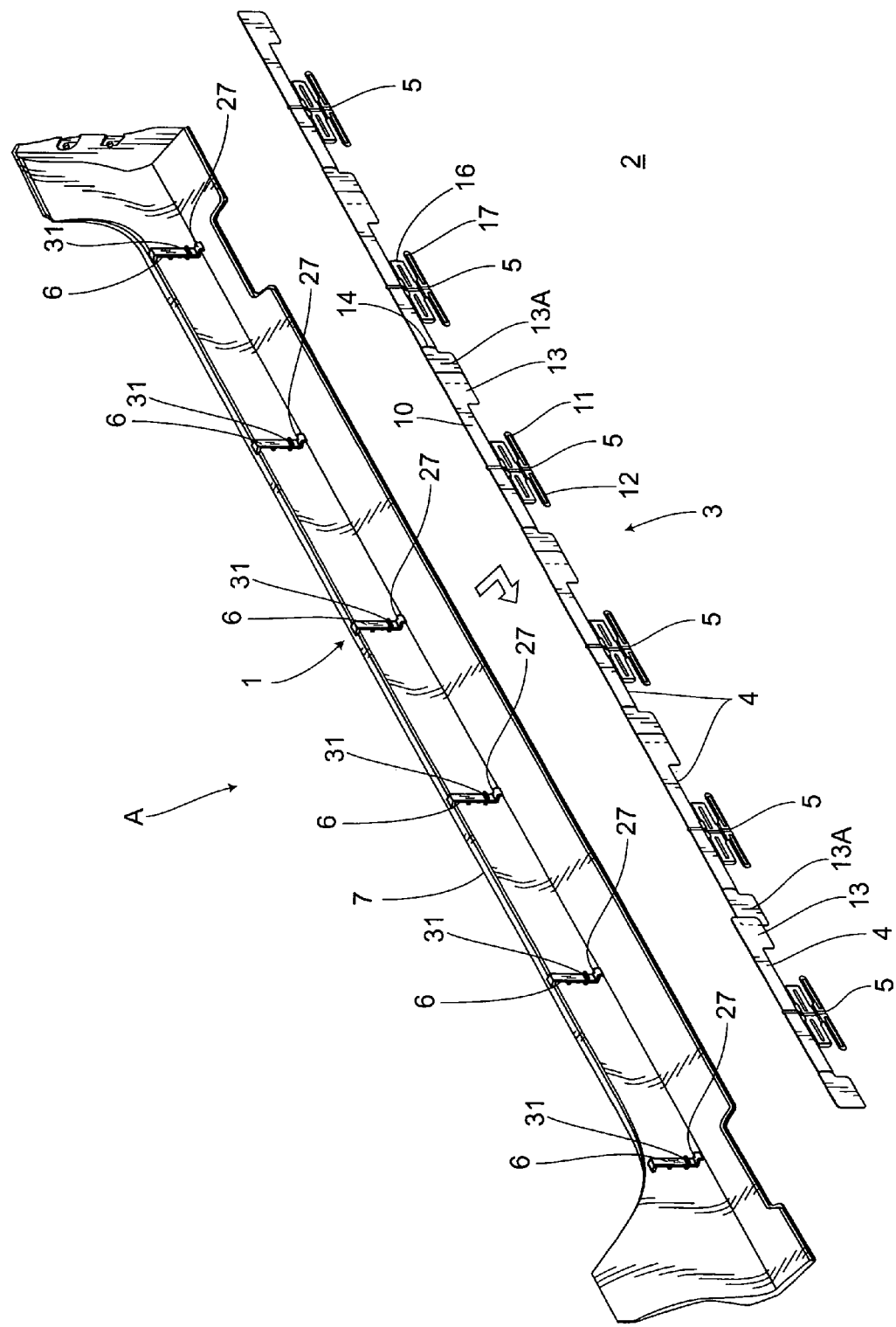
FIG. 1 is an exploded perspective view showing an attachment structure for attaching a side-under spoiler of a first embodiment of the present invention to a vehicle body.

FIG. 1 is a view showing an attachment structure A for attaching a side-under spoiler 1 to a vehicle body 2. A bracket 3 is bonded to a lower part of the vehicle body 2 so that the longitudinal direction of the bracket 3 may be aligned with the front-to-rear direction of the vehicle body 2. The bracket 3 comprises a plurality of bracket pieces 4 arranged side by side along the front-to-rear direction of the vehicle body 2. Each bracket piece 4 is formed with a supporting section 5 for supporting the side-under spoiler 1. In the present embodiment, one supporting section 5 is formed in one bracket piece 4.

An attaching section 6 engaging with the supporting section 5 of the bracket 3 is formed in two or more positions in the side-under spoiler 1. The side-under spoiler 1 is attached to the vehicle body 2 so that it may be aligned with the front-to-rear direction of the vehicle body 2 by engaging the two or more supporting sections 5 of the bracket 3 with the two or more corresponding attaching sections 6, respectively.

Figure 2:
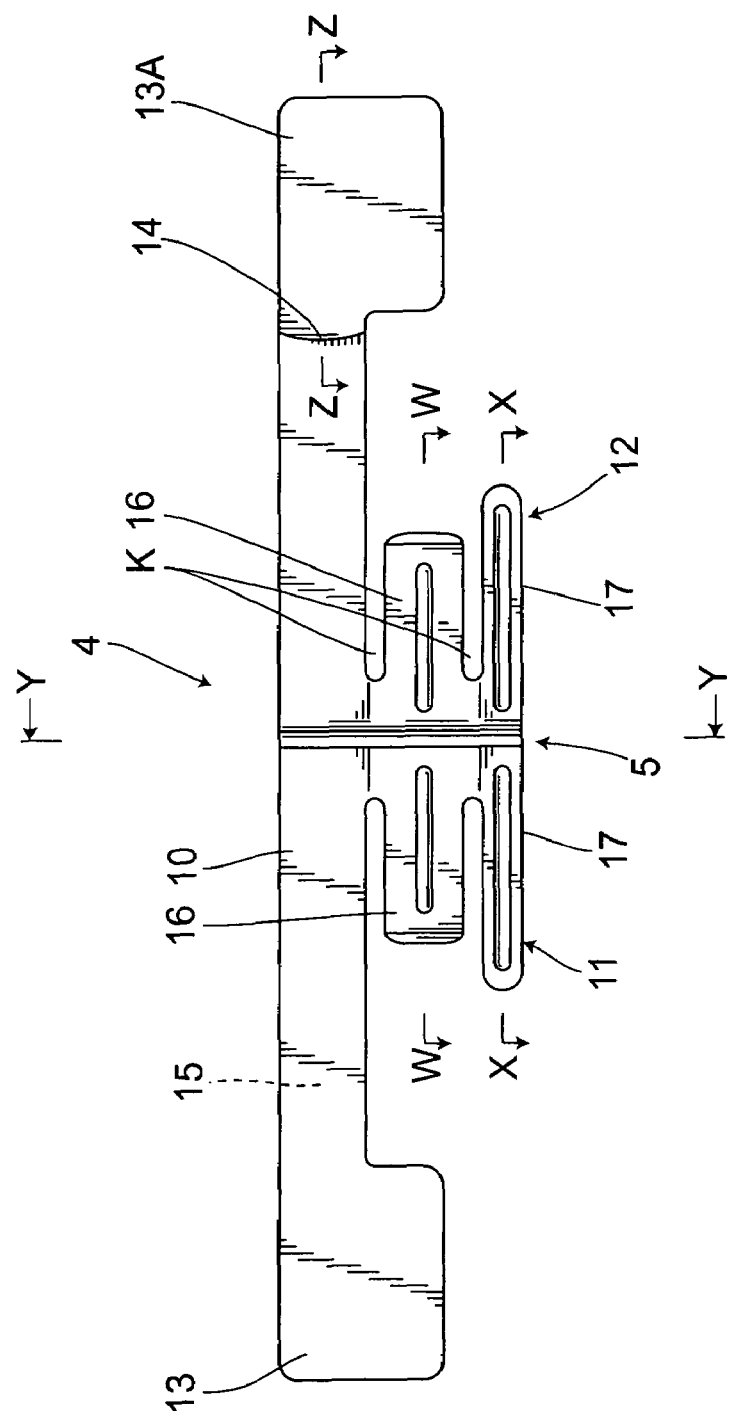
FIG. 2 is a front view showing a bracket piece of the first embodiment of the invention.

FIG. 2 is a front view of the bracket piece 4 which constitutes the bracket 3. The bracket piece 4 substantially comprises a bracket piece body 10, a first supporting section 11 and a second supporting section 12. Said supporting section 5 is constituted by these first supporting section 11 and second supporting section 12. Said bracket piece body 10 is substantially formed in an elongated rectangular plate shape, having overlapping sections 13, 13A formed on both sides in the longitudinal direction thereof, said overlapping sections 13,13A being wider in the vertical direction than the central section of the bracket piece body 10.

One of the overlapping sections (13A) is formed with a step 14 so that the rear surface of the overlapping section 13A is fitted to the surface of the bracket piece body 10 on the center thereof. The rear surface of the bracket piece body 10 is provided with a two-sided tape 15 as a bonding portion.

Moreover, the overlapping sections 13, 13A are joined to each other after performing position adjustment relative to each other both in the vertical and in the horizontal directions, thus improving degree of freedom in forming the bracket 3, enabling position adjustment in the front-to-rear (i.e., longitudinal) direction, through the adjustment of overlap width of the overlapping sections 13, 13A in the longitudinal directions.

Moreover, the overlapping sections 13 and 13A are formed vertically wider than the center side, thus enabling the position adjustment in the vertical direction by adjusting the overlap width in the vertical direction. Furthermore, the overlapping sections 13 and 13A are capable of being joined together by means of spot welding, bonding, etc., while they are joined strongly due to the overlapping sections 13 and 13A being brought into surface contact with each other.

Figure 3A:
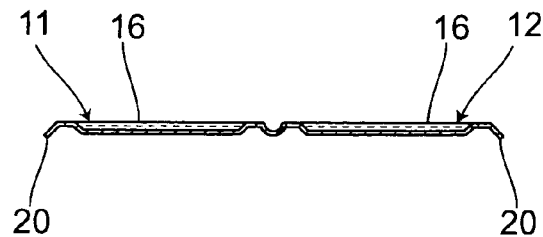
FIG. 3a is a section of the bracket piece taken along W-W line of FIG. 2, 3b is a section taken along X-X line of FIG. 2, 3c is a section taken along Y-Y line thereof, 3d is a section taken along Z-Z line thereof, respectively.
Figure 3B:
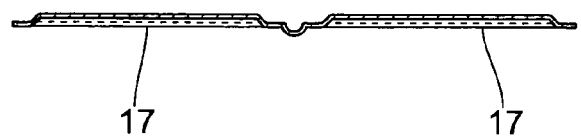

As shown in FIGS. 3a and 3b, the left-hand side first supporting section 11 is symmetrical in structure to the right-hand side second supporting section 12, each of those supporting sections 11 and 12 comprising a front support piece 16 extending in parallel with said bracket piece body 10 with an vertical interval K therebetween and a rear support piece 17 extending in parallel with the front support piece 16 with an vertical interval K therebetween. It is to be noted that the vertical length of the central section of the bracket piece body 10 is substantially equal to that of the front support piece 16, while the vertical length of the rear support piece 17 is smaller than that of the front support piece 16.

Figure 3C:
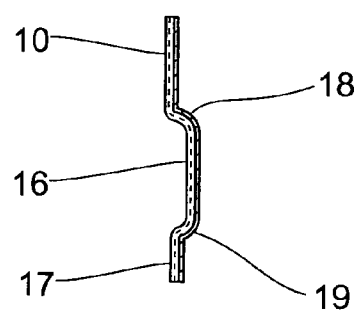
Figure 3D:
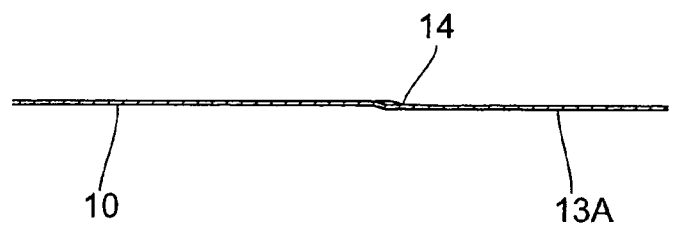

Further, as shown in FIG. 3c etc, a step part 18 is formed in the width direction in a position where the bracket piece body 10 is connected with the front support piece 16, while a step part 19 is formed in the width direction in a position where the rear support piece 17 is connected with the front support piece 16 such that the bracket piece body 10 is spaced apart from the front support piece 16 in the width direction by the step part 18, while the front support piece 16 is spaced apart from the rear support piece 17 in the width direction by the step part 19. Moreover, the bracket piece body 10 and the rear support piece 17 are located substantially in the same plane. Meanwhile, by the language "width direction" is meant the front-to-rear direction of the bracket 3.

Moreover, the distal end 20 of the front support piece 16 of said first supporting section 11 inclines toward the front, and the distal end 20 of the front support piece 16 of said second supporting section 12 inclines toward the front. These distal ends 20 are chamfered to define rounded corners. Moreover, the distal end of said rear support piece 17 is curved. Said bracket piece 4 is formed from a plate material having a spring property, such as spring steel.

Figure 4:
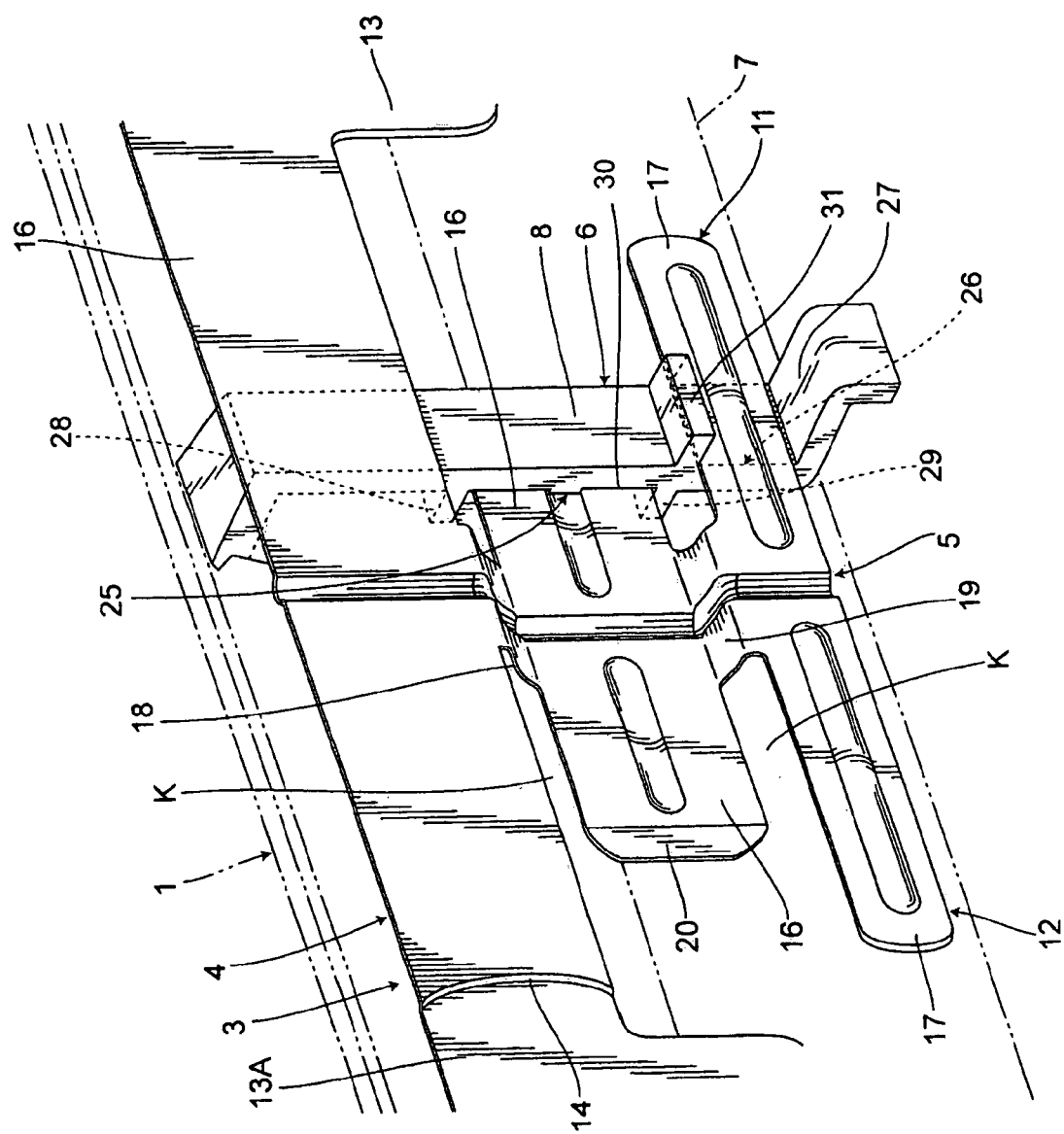
FIG. 4 is a perspective view showing a supporting section and an attaching section with the former being attached to the latter.
Figure 5:
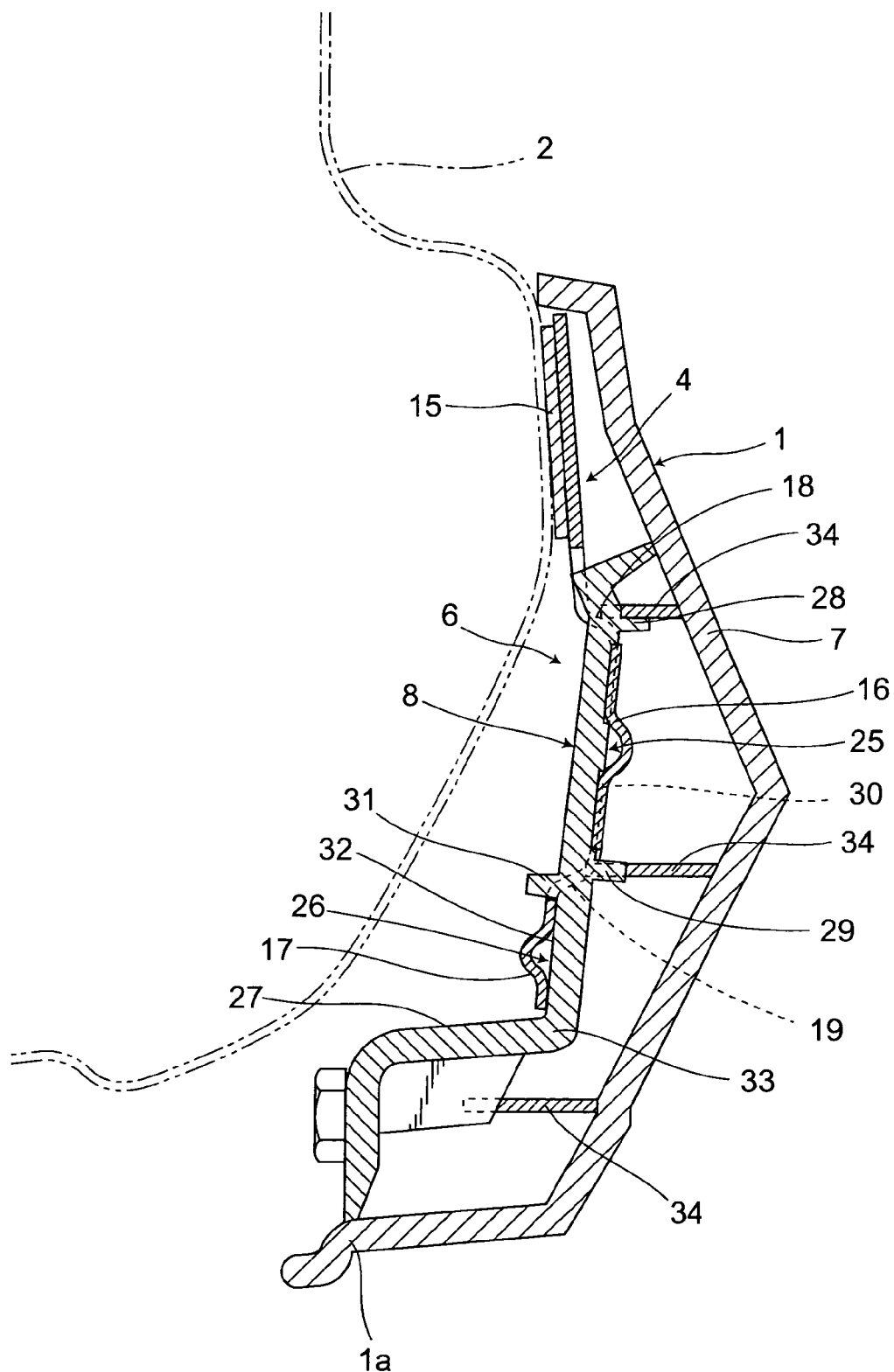
FIG. 5 is a longitudinal section of the supporting section and the attaching section with the former being attached to the latter.

As shown in FIGS. 1, 4 to 5, the side-under spoiler 1 substantially comprises the side-under spoiler body 7 and the attaching sections 6 that are engageable with the supporting sections 5 of the bracket 3.

The side-under spoiler body 7 is substantially formed in an elongated rectangular box shape that is open at a rear side. FIG. 1 is a view of the side-under spoiler 1 seen from a rear side thereof, and said attaching sections 6 are formed on a rear surface of a front part of the side-under spoiler body 7 so as to be formed integrally therewith.

As shown in FIG. 4, said attaching section 6 comprises an attaching body 8 which connects top and bottom sides of a rear surface of the side-under spoiler body 7, a first engagement recess 25 for engaging said front support piece 16 therein, a second engagement recess 26 for engaging said rear support piece 17 therein, and a guide 27 provided in the vicinity of said attaching section 6.

Said first engagement recess 25 and second engagement recess 26 each comprise a regulating part described later. Said attaching body 8 is tabular, substantially formed in the shape of a crank, arranged in parallel with said bracket 3 when it is in an attached state.

As shown in FIG. 5, said first engagement recess 25 is formed on a front side of said attaching body 8, and comprises a first upper regulation rib 28; a lower regulation rib 29 serving as the above-mentioned regulating parts; and a first abutting surface 30.

Said first upper regulation rib 28 and lower regulation rib 29 are formed to protrude toward the front. Said first abutting surface 30 is arranged in parallel with said bracket 3. On the other hand, said second engagement recess 26 is formed on a rear side of said attaching body 8, and comprises a second upper regulation rib 31 serving as said regulating part; and a second abutting surface 32. Said second regulation rib 31 is formed to protrude toward the rear. Said second abutting surface 32 is arranged in parallel with said bracket 3.

Said guide 27 is formed integrally with said attaching body 8, extending in the front-to-rear direction of the vehicle body, i.e., in the horizontal direction as viewed from a worker. The guide 27 comprises a plane protruding substantially perpendicularly from the lower end of the attaching body 8 toward the rear, having a tip end hanging down so as to be connected with the lower end 1a of said side-under spoiler 1.

A front side corner 33 as a junction of said guide part 27 and said attaching body 8 is formed to define a curvature. Furthermore, a reinforcing rib 34 which connects said attaching body 8 to the side-under spoiler 1 is formed on a front side of said attaching body 8.

Next is a description of an attachment procedure for the side-under spoiler 1 constituted thus way. First, the bracket 3 is fixed to the vehicle body 2 by firmly bonding said bracket piece bodies 10 to the lower side of the vehicle body 2 using a two-sided tape.

In other words, the bracket 3 is constituted by combining the bracket pieces 4. The bracket 3 is formed in advance by joining the bracket pieces 4 so as to correspond to the attaching sections 6 through the spot welding, bonding, etc of the overlapping sections 13 and 13A so that the bracket 3 thus formed is bonded to the attachment position of the vehicle body 2, using the two-sided tape 15.

Alternatively, a mark (not shown) indicating an attachment reference position may be put on the vehicle body 2 so that the bracket pieces 4 may be firmly bonded by the two-sided tape 15 to the vehicle body 2 from the right side, in accordance with the attachment reference position, whereby the left side bracket pieces 4 are arranged relative to the right side bracket pieces 4 in a manner that a part of each overlapping section 13A thereof is overlapped with the front surface of the overlapping section 13 of each right side bracket piece 4 so as to firmly bond them to the vehicle body 2, thereby constituting the bracket 3 by arranging a plurality of the bracket pieces 4 side by side.

In the meantime, the overlapping sections 13 and 13A are joined to each other by bonding or the like. In that case, the bracket pieces 4 are positioned and fixed such that the supporting sections 5 are aligned with the corresponding attaching sections 6 of the side-under spoiler 1, respectively.

Figure 6:
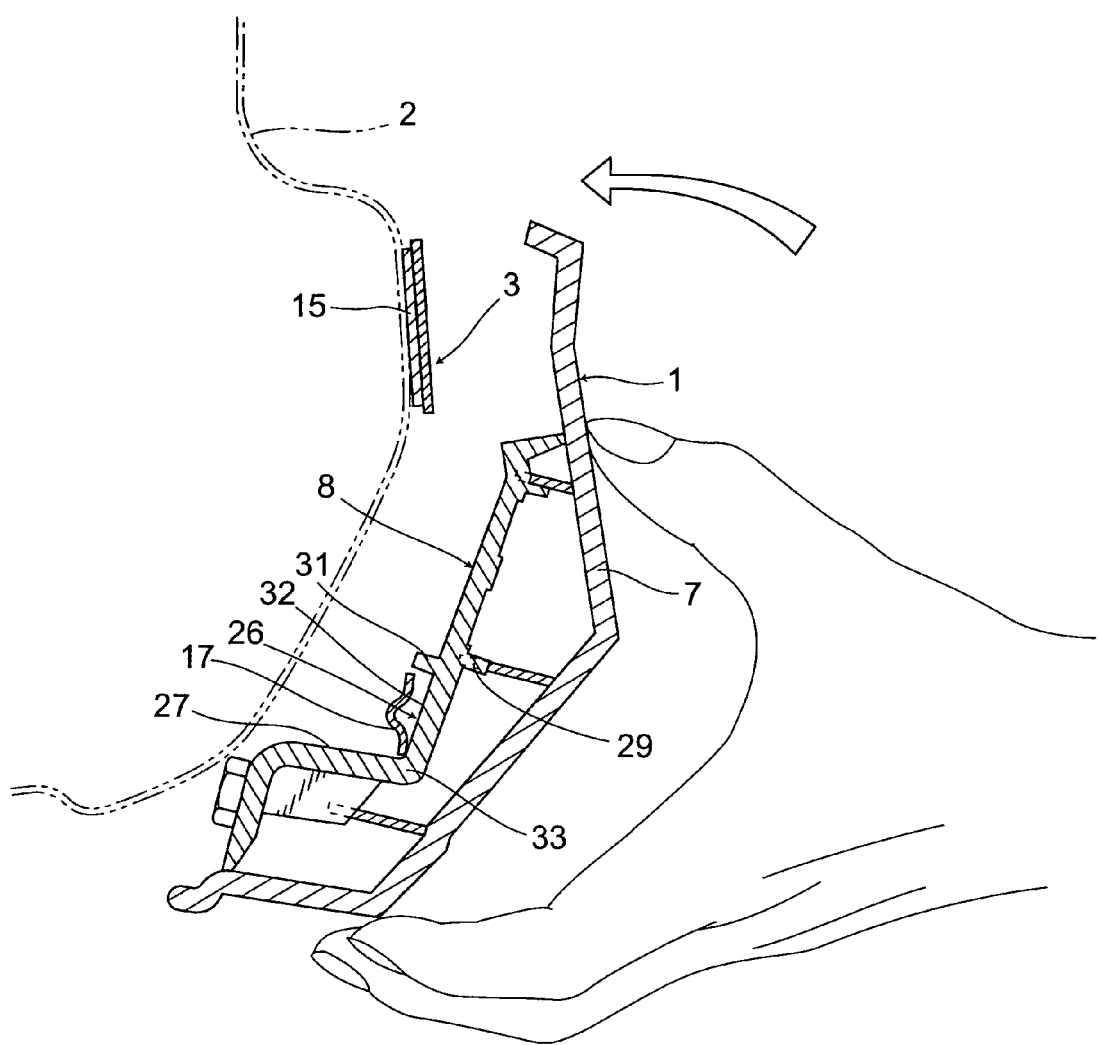
FIG. 6 is a longitudinal section of the supporting section and the attaching section when the latter is in the positioning process relative to the former.

Subsequently, the positioning of the side-under spoiler 1 is carried out. Namely, as shown in FIG. 6, the side-under spoiler 1 is brought close to the bracket 3 fixed to the vehicle body 2 from an obliquely downward position on a front side, thus abutting the guide 27 provided in the attaching section 6 to the rear support piece 17.

At this moment, due to the guide 27 being provided near the attaching section 6, it is possible for a worker to visually confirm the positions of the guide 27 and the rear support piece 17 from above, thus enabling him to easily abut the former to the latter. After abutting said guide 27 to said rear support piece 17, the side-under spoiler 1 is rotated around the lower end of the rear support piece 17 (in a direction as illustrated by an arrow) until the upper end of the side-under spoiler 1 abuts to the vehicle body 2.

At this moment, the side-under spoiler 1 can be smoothly rotated due to the curved shape of the guide 27. Thus way, the side-under spoiler 1 can be positioned easily and reliably.

Assuming that the side-under spoiler 1 is not provided with the guide 27, positioning the attaching sections 6 provided in two or more positions relative to the corresponding supporting sections 5 would require a process of trial and error such that such lengthy side-under spoiler 1 is moved from side to side and up and down, and thus not only the positioning work becomes difficult, but the side-under spoiler 1 is likely to damage the surface of the vehicle body 2 at that time.

Moreover, in the case that the attaching body 8 is erroneously allowed to collide with the support pieces 16 and 17 due to the support pieces 16 and 17 being unable to be successfully engaged with the engagement recesses 25 and 26, respectively, there would be concern that the attaching sections 6 might be damaged, thus leading to a necessity for reinforcing the attaching section 6 with a rib in order to prevent damage to such attaching section 6.

Providing such a rib not only could cause the increase of cost, but also could induce sinks, and thus there would be concern that a quality-related problem will possibly occur. According to the invention, however, since each attaching section 6 is provided with the guide 27, the attaching sections 6 provided in two or more positions in the side-under spoiler 1 can be easily positioned to the corresponding support pieces 16 and 17, without damaging the vehicle body 2. Further, improvement of quality as well as reduction of manufacture cost is ensured since a rib is not needed.

Then, when the upper end of the side-under spoiler 1 is abutted to the vehicle body 2, the side-under spoiler 1 is allowed to slide in the front-to-rear direction of the vehicle 2. Namely, the side-under spoiler 1 is moved from side to side so that the rear support piece 17 is sandwiched between the second upper regulation rib 31 and the guide 27 to thereby be engaged with the second engagement recess 26.

Thus, the distal end of the front support piece 16 reaches the first engagement recess 25. The front support piece 16 is sandwiched between the first upper regulation rib 28 and the lower regulation rib 29 to thereby be engaged with the first engagement recess 25. Then, the rear surface of the front support piece 16 is abutted to the first abutting surface 30 while the front surface of said rear support piece 17 is abutted to the second abutting surface 32, thereby engaging the attachment 6 with the supporting section 5, as illustrated in FIGS. 4 and 5.

By attaching the attaching section 6 to the supporting section 5 thus way, the downward movement of the side-under spoiler 1 can be regulated by the first and second upper regulation ribs 28 and 31, while the upward movement of the side-under spoiler 1 can be regulated by the lower regulation rib 29 and the guide 27. After positioning the side-under spoiler 1, both the attaching sections 6 and the supporting sections 5 hide in the side-under spoiler 1, as illustrated in FIG. 5, thus leading to blind procedures. Nevertheless, the provision of the guide 27 ensures the firm engagement of the attaching sections 6 to the predetermined corresponding supporting sections 5.

According to the above-described side-under spoiler 1, the two-sided tape 15 for bonding the bracket 3 to the vehicle body 2 is provided on an upper part of the bracket 3, and thus when the side-under spoiler 1 is attached, the peeling load of the two-sided tape 15 acts downward, thus securing the attachment strength of the side-under spoiler 1.

Moreover, against the downward load, the first upper regulation rib 28 is allowed to be locked by the front support piece 16, while the second upper regulation rib 31 is allowed to be locked by the rear support piece 17, thus enabling the side-under spoiler 1 to be supported reliably. Furthermore, when an external force to bring the lower side of the side-under spoiler 1 toward the vehicle body 2 is applied, then the rear support piece 17 receives such external force, and absorbs the same with the bracket piece 4 having spring properties or resiliency. Accordingly, said external force can be absorbed without the load being concentrated on a part of the bracket 3 and/or the side-under spoiler 1.

According to the foregoing embodiment of the present invention, there is provided the side-under spoiler 1 supported by the vehicle body 2 through the bracket 3 provided at a lower side of the vehicle body 2, comprising: the side-under spoiler body 7 supported at a lower part of the bracket 3 by the supporting sections 5 of the bracket 3 elongated in a front-to-rear direction of the vehicle body 2; one or more attaching sections 6 for engaging said side-under spoiler body 7 to said supporting sections 5; and one or more guides 27 for guiding said attaching sections 6 to said supporting sections 5.

Accordingly, the side-under spoiler 1 can be easily positioned relative to the vehicle body 2, ensuring the reliable attachment of the former to the latter. Further, since the proper positioning is ensured, any rib for reinforcing the attaching sections does not need to be provided, thus realizing reduction of cost as well as improvement of quality due to the sinks being made less likely to be induced.

Furthermore, since the guide 27 is provided on a rear side of the lower part of the attaching section 6 and on a front side of the vehicle body 2, it is possible for a worker to visually confirm the positional relationship between the guide 27 and the rear support piece 17 from above at the time of positioning process, thus enabling him to easily position the side-under spoiler 1. Still further, since the reinforcing rib 34 is provided in the attaching body 8, strength is insured while reducing the attaching section 6 in weight.

Also, since the regulation ribs 28, 29, and 31 and the guide part 27 are provided, the displacement of the side-under spoiler 1 can be prevented even if the external force in the up-and-down direction is applied thereto after being attached to the bracket 3.

In addition to the foregoing, the side-under spoiler 1 is supported by: the bracket 3 elongated in a front-to-rear direction of the vehicle body 2; the supporting sections 5 provided in the bracket 3; the side-under spoiler body 7 supported at a lower part of the bracket 3 by the supporting sections 5; the attaching sections 6 for engaging said side-under spoiler body 7 to said supporting sections 5; and the guides 27 provided in said side-under spoiler body 7 for guiding said attaching sections 6 to said supporting sections 5, whereby the side-under spoiler 1 can be easily positioned relative to the vehicle body 2.

Next is a description of a second embodiment of the present invention, in which the same numerals are assigned to the same components as those described, and their repeated description will be omitted.

Figure 7:
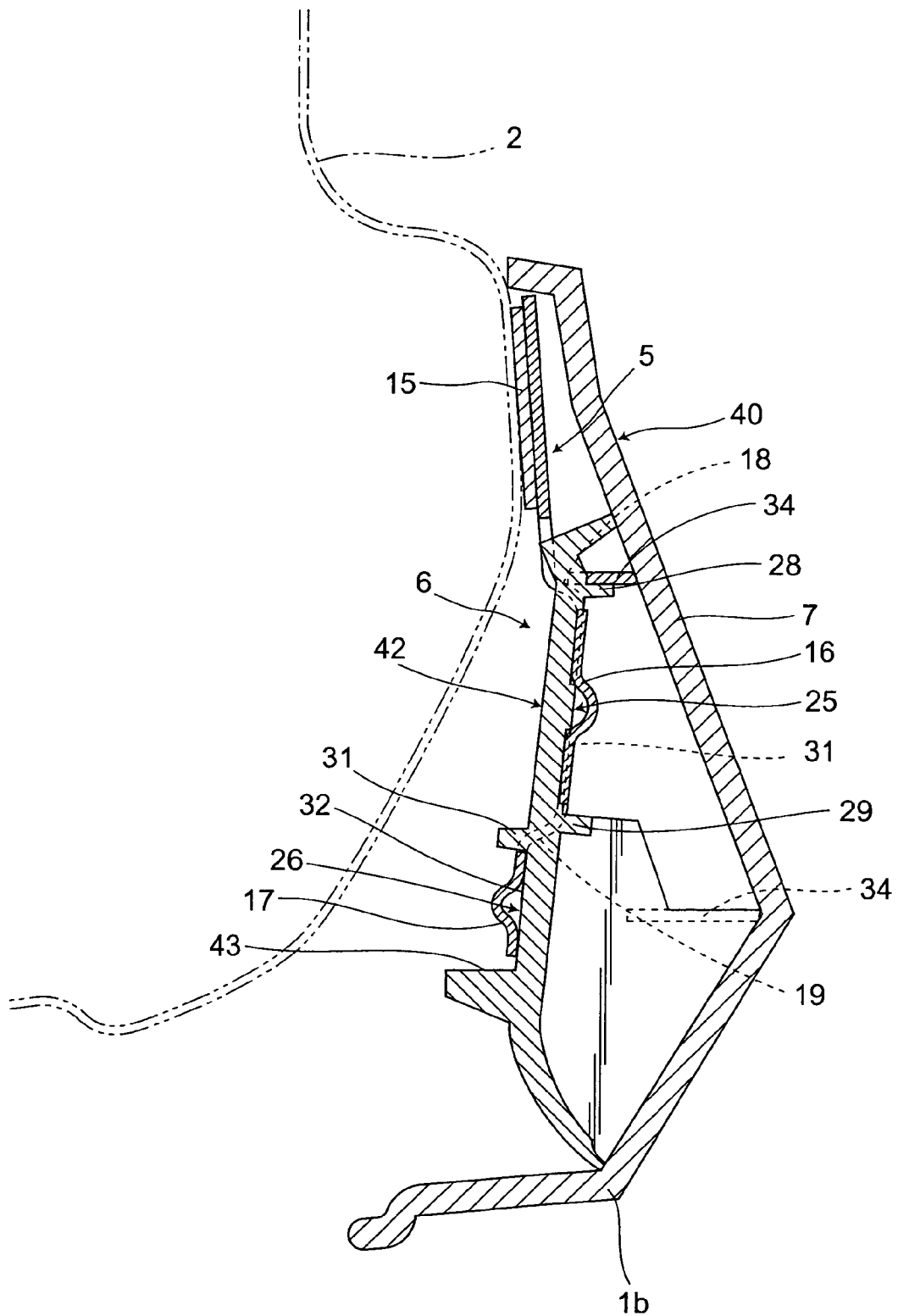
FIG. 7 is a longitudinal section of the supporting section and the attaching section with the former being attached to the latter, in accordance with a second embodiment of the invention.

As shown in FIG. 7, a side-under spoiler 40 of the present embodiment comprises the attaching section 6, said attaching section 6 comprising an attaching body 42 which connects top and bottom sides of a frontal portion of a rear surface of the side-under spoiler body 7, the first engagement recess 25 for engaging said front support piece 16 therein, the second engagement recess 26 for engaging said rear support piece 17 therein, and a guide part 43 formed integrally with said attaching body 42, said guide part 43 extending in the horizontal direction.

Said attaching body 42 is made up of a tabular member of an inverted J shape, while said guide 43 is constituted of a projection protruded from said attaching body 42. The lower end of the attaching body 42 is connected with a corner 1b of the side-under spoiler 1. By constituting the guide 43 thus way, the guide 43 can be formed without changing the basic shape of the attaching body 42, thus realizing the reduction of cost.

Figure 8:
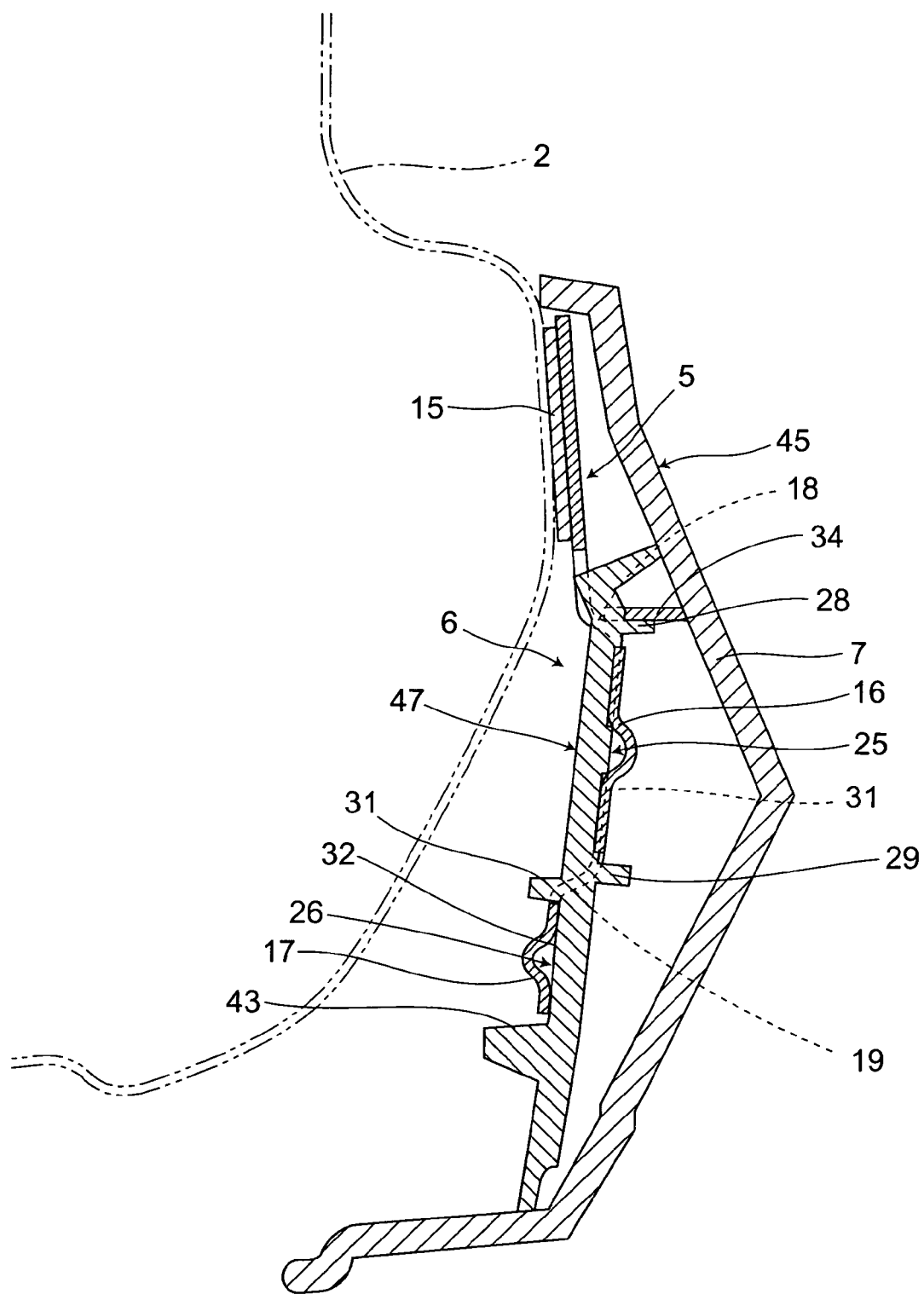
FIG. 8 is a longitudinal section of the supporting section and the attaching section with the former being attached to the latter, in accordance with a modified example of the second embodiment of the invention.

Referring to FIG. 8 showing a modified example of the foregoing embodiment, a side-under spoiler 45 comprises the attaching section 6, said attaching section 6 comprising an attaching body 47 which connects top and bottom sides of a frontal portion of a rear surface of the side-under spoiler body 7, the first engagement recess 25 for engaging said front support piece 16 therein, the second engagement recess 26 for engaging said rear support piece 17 therein, and the guide part 43 formed integrally with said attaching body 47, said guide part 43 extending in the horizontal direction.

The attaching body 47 is made up of a tabular member formed substantially linear. Said guide 43 is formed integrally with said attaching body 47, extending in the horizontal direction as the front-to-rear direction of the vehicle body 2, defining a plane projected substantially perpendicularly from the lower end of said attaching body 47 toward the rear side. It is to be noted that the shape of the attaching body 42 may be varied suitably depending on the shape of the side-under spoiler 45.

Figure 9A:
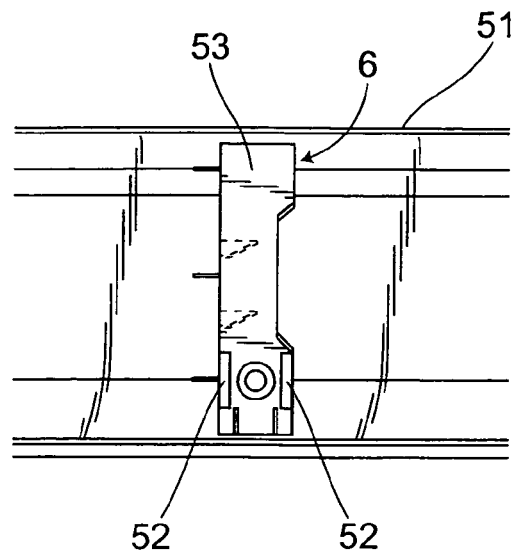
FIG. 9a is a front view showing the supporting section and the attaching section with the former being attached to the latter, while FIG. 9b a longitudinal section thereof, in accordance with another modified example of the second embodiment of the invention.
Figure 9B:
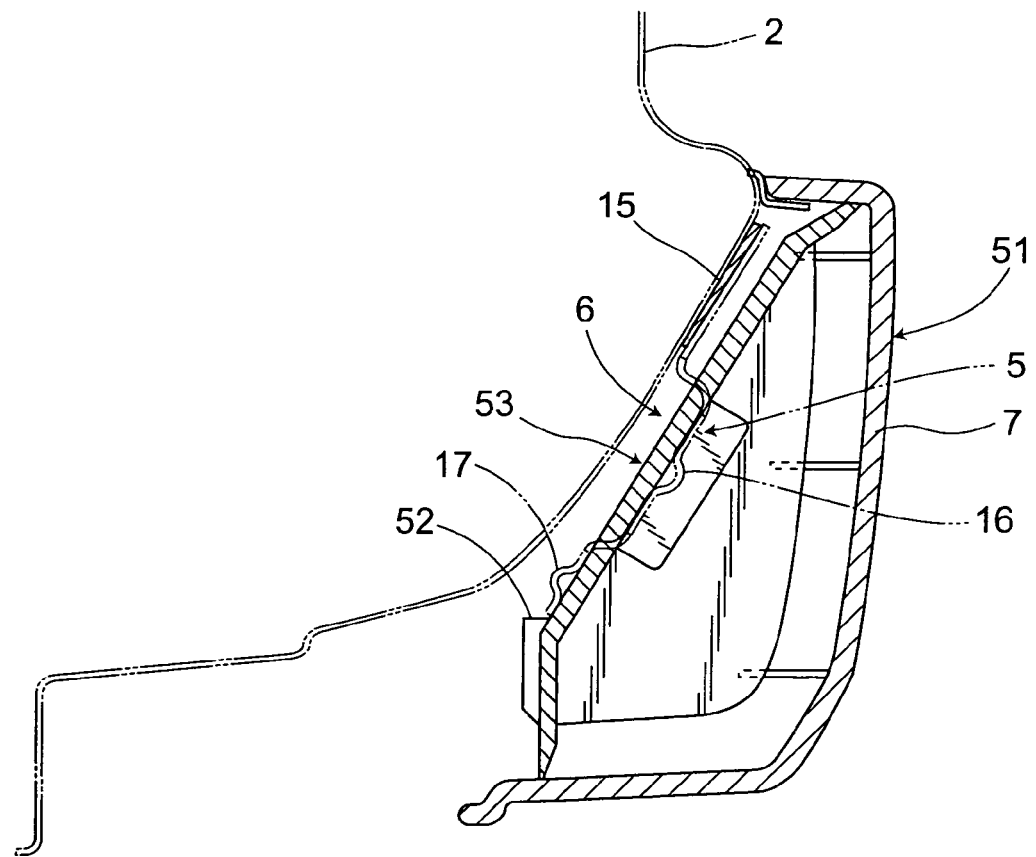

Referring to FIGS. 9a and 9b showing a further modified example of the foregoing embodiment, a side-under spoiler 51 comprises a pair of guides 52 provided on both sides of an attaching body 53, said guide 52 being made up of a protrusion extending in the vertical direction. Even if the guide is formed in such shape, the side-under spoiler 51 can be positioned reliably.

Figure 10A:
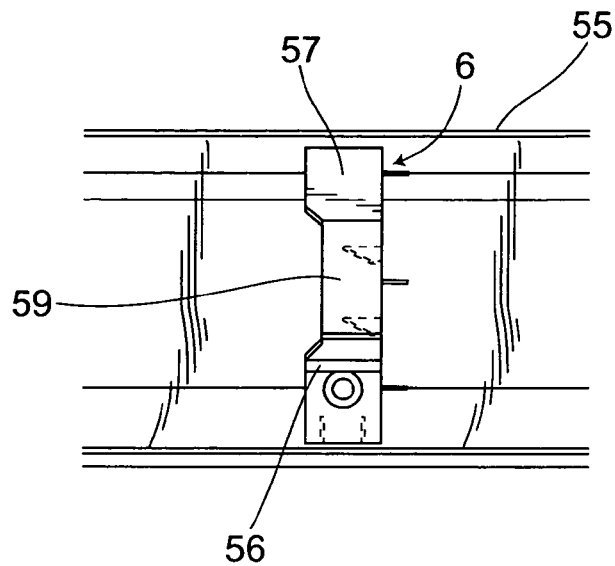
FIG. 10a is a front view showing the supporting section and the attaching section with the former being attached to the latter, while FIG. 10b a longitudinal section thereof, in accordance with a further modified example of the second embodiment of the invention.
Figure 10B:
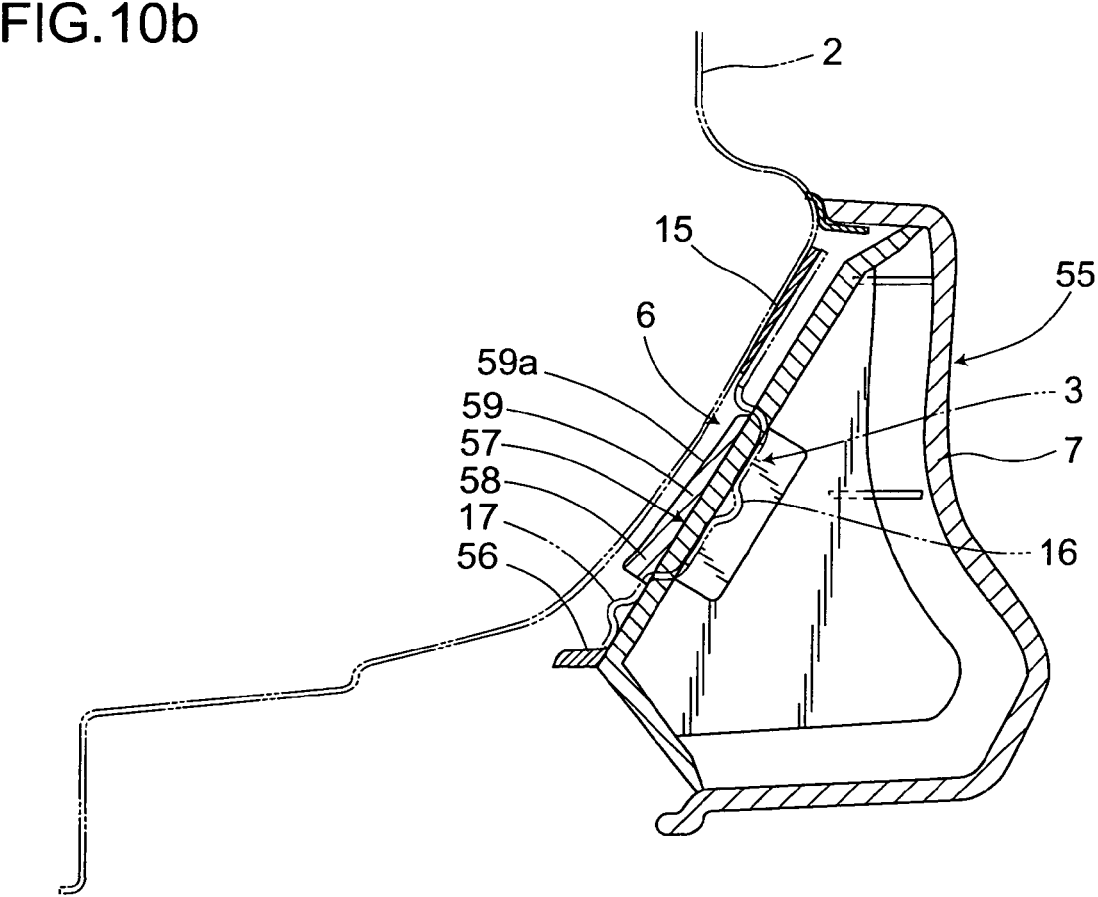

Referring to FIGS. 10a and 10b showing a still further modified example of the foregoing embodiment, a side-under spoiler 55 comprises a guide 56 protruded toward the vehicle body 2 in the horizontal direction from a corner of a dogleg attaching body 57, said guide 56 extending from side to side in the horizontal direction.

Moreover, the second upper regulation rib 58 is formed integrally with an abutting section 59 extending in the vertical direction. Said abutting section 59 comprises a surface 59a that matches the contour of the vehicle body 2. By constituting the side-under spoiler 55 thus way, durability of the side-under spoiler 55 to withstand the load applied thereto toward the vehicle body 2 can be improved.

Further, when an external force toward the vehicle body 2 acts upon the side-under spoiler 55, yet the supporting section 5 having spring properties receives such external force. If the supporting section 5 is deformed, then the abutting section 59 is allowed to abut to the vehicle body 2 before the supporting section 5 and the attaching section 6 abut thereto, thus preventing the damage to the vehicle body 2.

Next is a description of a third embodiment of the present invention, in which the same numerals are assigned to the same components as those described, and their repeated description will be omitted.

Figure 11:
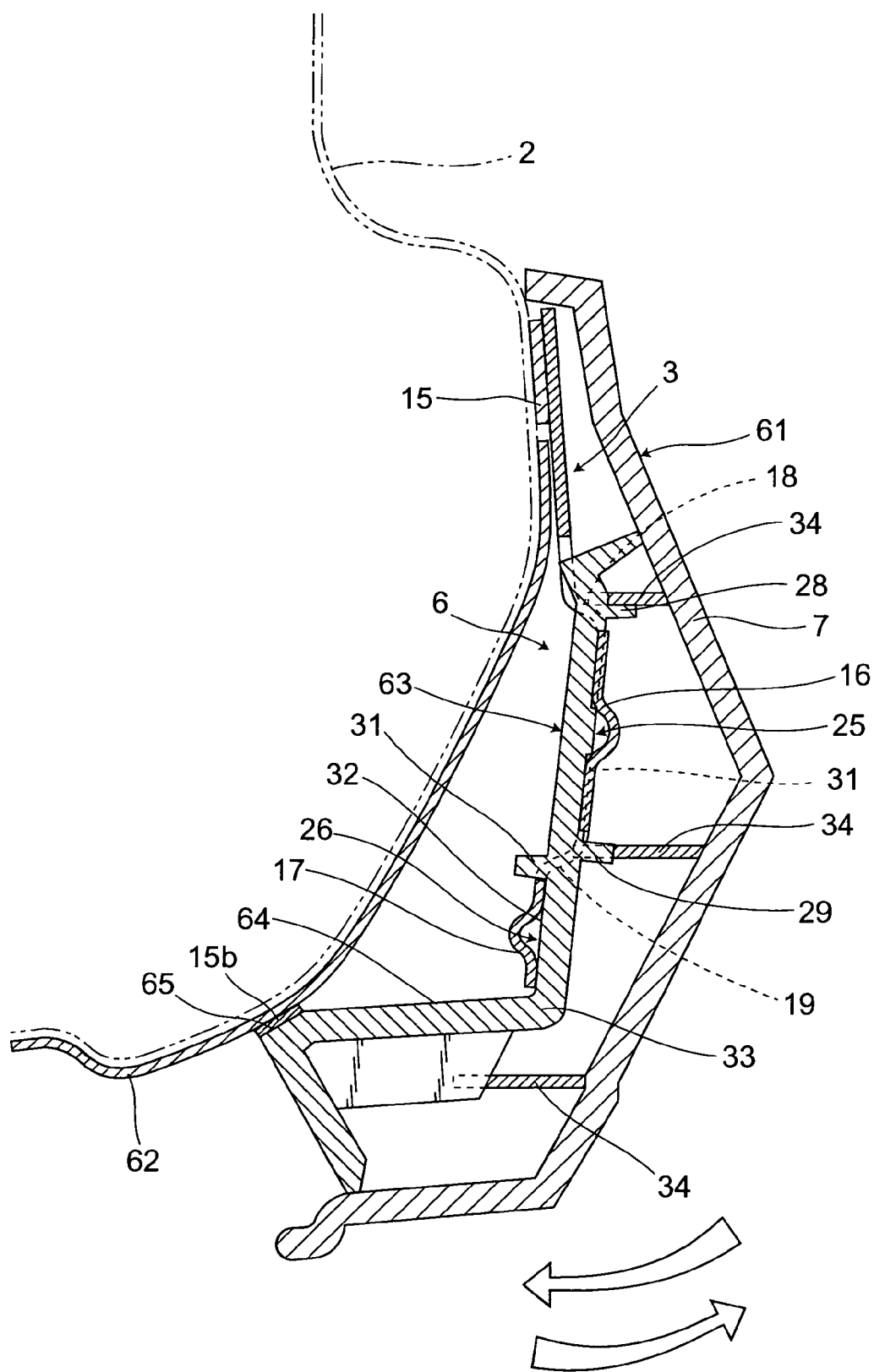
FIG. 11 is a longitudinal section of the supporting section and the attaching section with the former being attached to the latter, in accordance with a third embodiment of the invention.

A side-under spoiler 61 shown in FIG. 11 is to be attached to the vehicle body 2 that is treated with undercoating 62 beforehand.

The two-sided tape 15 is applied to a portion of the vehicle body 2 that is not treated with undercoating 62 so that said bracket 3 is fixed thereto.

An attaching body 63 is substantially formed in the shape of a crank, including an extension section 64 extending in the horizontal direction from a front corner thereof toward the vehicle body 2, a seating surface 65 provided on a rear corner thereof (i.e., adjacent to the vehicle body 2), said seating surface 65 matching a contour of the vehicle body 2 and fixed thereto via a two-sided tape 15b.

Assuming that the width of the two-sided tape 15 is narrowed in order to avoid the treatment with undercoating 62, the strength will drop. In other words, when an external force acts in the directions illustrated by arrows, due to car washing etc., the peeling load relative to the two-sided tape 15 decreases due to the width of the two-sided tape 15 being narrowed.

According to the invention, however, the external force acting in the illustrated directions is absorbable by said seating surface 65 being fixed to the vehicle body 2 with the two-sided tape 15b, thus ensuring sufficient strength.

According to the foregoing embodiment, there is provided the side-under spoiler 61 supported by the vehicle body 2 through the bracket 3 provided at a lower side of the vehicle body 2, comprising: the side-under spoiler body 7 supported at a lower part of the bracket 3 by the supporting sections 5 of the bracket 3 elongated in a front-to-rear direction of the vehicle body 2; one or more attaching sections 6 for engaging said side-under spoiler body 7 to said supporting sections 5; and one or more extension sections 64 extending from said attaching sections 6 toward the vehicle body 2.

Owing to the extension sections 64, the side-under spoiler 61 can be easily positioned to the vehicle body 2. At the same time, when an external force toward the vehicle body 2 acts upon the side-under spoiler 61, yet the extension section 64 receives such external force by abutting to the vehicle body 2, thus preventing the deformation or damage of the side-under spoiler 61.

Moreover, since the extension section 64 can function also as a guide, enabling the attachment 6 to be properly positioned to the supporting section 5, the workability at the time of attaching the side-under spoiler 61 can be improved.

Still further, owing to the extension sections 64, the rigidity of the side-under spoiler 61 can be improved even if the attachment area of the two-sided tape 15 is reduced, while decreasing the amount of the two-sided tape 15 used, thereby realizing cost reduction.

It is also to be noted that whilst an area bondable by the two-sided tape 15 becomes narrow when the vehicle body 2 is treated with the undercoating 62 up to the upper part thereof, it is not necessary to shift the side-under spoiler 61 upward to secure an area to be bonded by the two-sided tape 15 since the rigidity of the side-under spoiler 61 can be improved by providing the extension section 64, thereby enabling a designing area to be enlarged.

Figure 12:
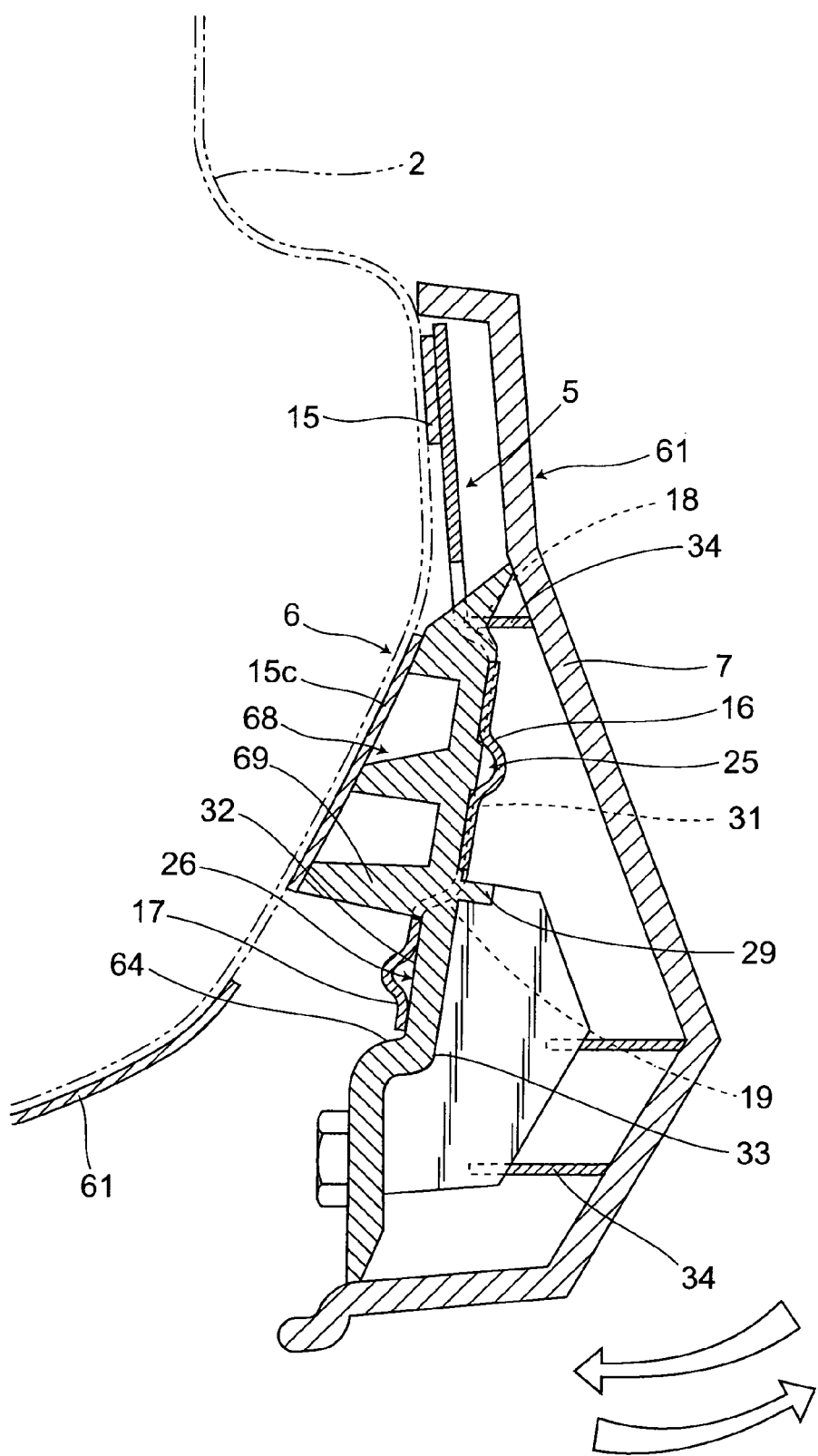
FIG. 12 is a longitudinal section of the supporting section and the attaching section with the former being attached to the latter, in accordance with a modified example of the third embodiment of the invention.

Alternatively, there may be provided a modified extension section 68 that is formed integrally with said second upper regulation rib 69, as shown in FIG. 12.

Thus, a contact area with the vehicle body 2 can be increased, thus enabling the side-under spoiler to withstand a greater external force. Moreover, since the extension section 68 can be formed by machining, increase of the cost due to the provision of the extension section 68 can be reduced to minimum. Furthermore, rigidity against an external force can be improved by fixing the extension section 68 using the two-sided tape 15c.

In addition to the foregoing, the side-under spoiler 61 is supported by: the bracket 3 elongated in a front-to-rear direction of the vehicle body 2; the supporting sections 5 provided in the bracket 3; the side-under spoiler body 7 supported at a lower part of the bracket 3 by the supporting sections 5; the attaching sections 6 for engaging said side-under spoiler body 7 to said supporting sections 5; and the extension sections 64 extending from he attaching sections 6 toward the vehicle body 2, whereby the side-under spoiler 61 can be easily positioned relative to the vehicle body 2. Further, when an external force toward the vehicle body 2 acts upon the side-under spoiler 61, yet the extension section 64 receives such external force by abutting to the vehicle body 2, thus preventing the deformation or damage of the side-under spoiler 61.

Hereinafter will be described a fourth embodiment of the present invention with reference to FIGS. 13 and 14, in which the same numerals are assigned to the same components as those described, and their repeated description will be omitted.

Figure 14A:
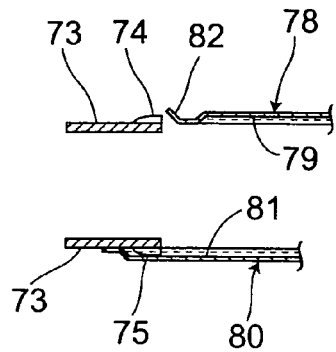
FIG. 14a is a traverse section of the supporting section positioned relative to the attaching section, while FIG. 14b a front view thereof, in accordance with the fourth embodiment of the invention.

A side-under spoiler 71 of the present embodiment comprises an attaching section 72, said attaching section 72 comprising an attaching body 73 including a first lug 74 and a second lug 75, as shown in FIG. 14a. The first lug 74 is formed to protrude forward, while the second lug 75 is formed to protrude rearward.

Figure 13:
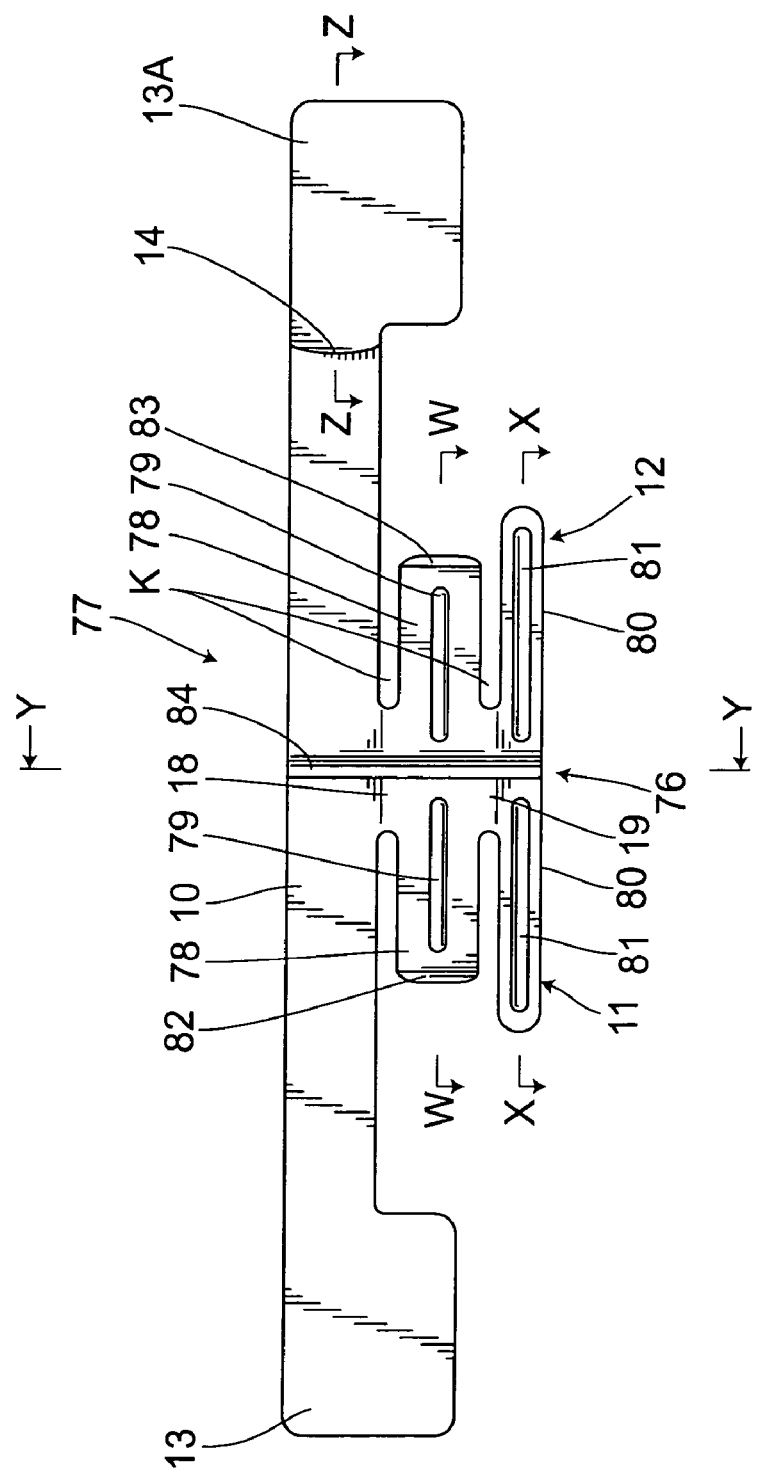
FIG. 13 is a front view showing the bracket piece for attaching the side-under spoiler, in accordance with a fourth embodiment of the invention.

As shown in FIG. 13, a supporting section 76 comprises a first bead 79 (i.e., elevated portion) provided in the center of the vertical length of a front support piece 78 for a bracket piece 77, and a second bead 81 provided in the center of the vertical length of a rear support piece 80. The first bead 79 serves as a locking part provided in the supporting section so as to engage with said first lug 74, while the second bead 81 also serves as a locking part provided in the supporting section so as to engage with said second lug 75, Said first bead 79 is prolonged in a horizontal direction, and it is formed convex toward a front, while said second bead 81 is prolonged in a horizontal direction, and is formed convex toward a rear. In the meantime, the first and second beads 79 and 81 are each formed by, for example, press-working a plate material that constitutes the bracket piece 77, to thereby the rigidity of a portion where they are formed.

Further, the distal end 82 of the front support piece 78 of said first supporting section 11 inclines forward. Likewise, the distal end 83 of the front support piece 78 of said second supporting section 12 inclines forward. The corners of said distal ends 82 and 83 are chamfered to define rounded corners. Moreover, the distal end of said rear support piece 80 is also curved.

Figure 14B:
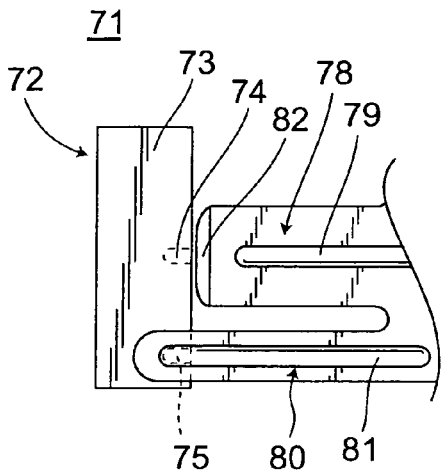

Next is a description of an action of the above-described side-under spoiler. First, the side-under spoiler 71 is positioned by engaging the second lug 75 provided in the attaching section 72 with the second bead 81 provided in the rear support piece 80, as shown in FIG. 14b.

Figure 15A:
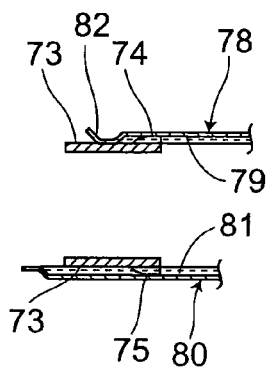
FIG. 15a is a traverse section of the supporting section engaged with the attaching section, while FIG. 15b a front view thereof, in accordance with the fourth embodiment of the invention.
Figure 15B:
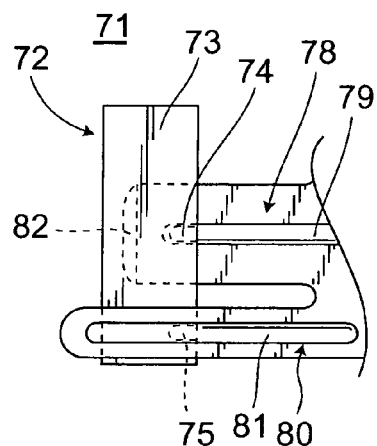
Figure 16A:
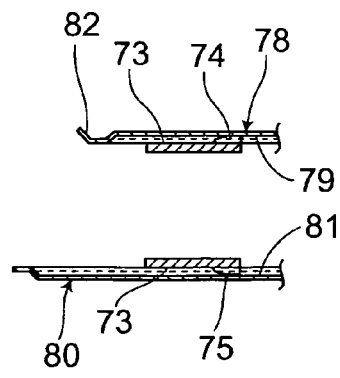
FIG. 16a is a traverse section of the supporting section attached to the attaching section, while FIG. 16b a front view thereof, in accordance with the fourth embodiment of the invention.
Figure 16B:
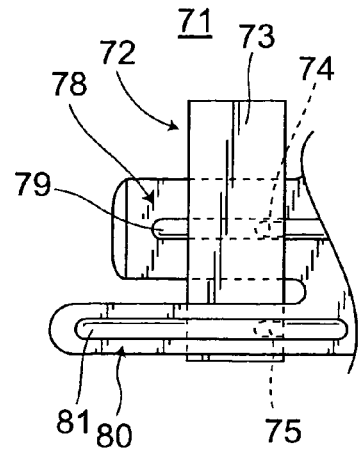

Subsequently, when the side-under spoiler 71 is moved in a horizontal direction (to the right in the drawing), the distal end 82 of the front support piece 78 will reach said first lug 74. At this moment, since the second lug 75 is engaged with the second bead 81, it can move horizontally, without allowing the attaching section 72 to be displaced from the supporting section 76, as shown in FIG. 15.

When the side-under spoiler 71 is further moved, the distal end 82 of the front support piece 78 goes beyond the first lug 74, and then the first lug 74 engages with the first bead 79.

At this moment, since the distal end 82 of the front support piece 78 is inclined toward a front, and the bracket piece body 10 has spring properties, the distal end 82 of the front support piece 78 can easily go beyond the first lug 74 by moving the side-under spoiler 71 in a horizontal direction, and thus a worker can sense the engagement of the attaching section 72 to a predetermined position.

Moreover, the first and second lugs 74 and 75 which engage with the first and second beads 79 and 81 function also as a stopper, respectively. That is, they also function to retain the side-under spoiler 71.

According to the foregoing embodiment, there is provided the side-under spoiler 71 supported by the vehicle body 2 through the bracket 3 provided at a lower side of the vehicle body 2, comprising: the side-under spoiler body 71 supported at a lower part of the bracket 3 by supporting sections 76 of the bracket 3 elongated in a front-to-rear direction of the vehicle body 2; one or more attaching sections 72 for engaging said side-under spoiler body 71 to said supporting sections 76, said attaching section 72 being provided with the first and second lugs 74 and 75 engaging with corresponding locking parts provided as beads 79 and 81 in said supporting section 76.

Accordingly, the attaching section 72 can be properly positioned to the supporting section 76. Moreover, from the engagement of the first and second lugs 74 and 75 to the beads 79 and 81 provided in the supporting section 76, the worker can sense the fact that the attaching section 72 has engaged to a predetermined position. Furthermore, the first and second lugs 74 and 75 also function as stoppers once they are engaged with the beads 79 and 81. That is, they have a function to retain the side-under spoiler 71.

Moreover, since the bracket 3 has spring properties, and the distal ends 82 and 83 of the front support piece 78 are inclined toward the front, shifting the side-under spoiler 71 in a horizontal direction allows the distal ends 82 and 83 of the front support piece 78 to go beyond the first lug 74 provided in the attaching section 72, so that the bracket piece 77 is elastically deformed, while it returns to an original form when the first lug 74 engages with the first bead 79. Accordingly, even if in a blind procedure, the worker can sense the fact that the attaching section 72 has engaged with the supporting section 76 and thus securely attached thereto.

The present invention is not limited to the foregoing embodiments, but various modifications are possible within the scope of the invention. Although the bracket is constituted by connecting two or more bracket pieces in the foregoing embodiments, it may be formed in a one-piece structure beforehand.

Further, the bracket may be formed from a spring material. The attaching sections may be formed integrally with the side-under spoiler body, or separately provided so as to be fixed to the side-under spoiler body by a suitable means. It should be noted that the foregoing embodiments may be suitably combined with one another although they were described independently of one another in the foregoing embodiments.

What is claimed is:

1. A side-under spoiler supported by a vehicle body through a bracket provided at a lower side of the vehicle body, comprising:
    a side-under spoiler body supported at a lower part of the bracket by supporting sections of the bracket elongated in a front-to-rear direction of the vehicle body;
    one or more attaching sections for engaging said side-under spoiler body to said supporting sections; and
    one or more guides for guiding said attaching sections to said supporting sections, each of said guides protruding substantially perpendicularly from each of said attaching sections,
    wherein each of said attaching sections further comprise a first engagement recess and a second engagement recess for engaging said supporting portions of said bracket,
    wherein said first engagement recess is defined by a first regulation rib and a second regulation rib, said first regulation rib and said second regulation rib including a plane protruding frontwardly from each of said attaching sections, in a vehicle width direction, and
    wherein said second engagement recess is defined by a third regulation rib and said guide, said third regulation rib including a plane protruding rearwardly from each of said attaching sections, in a vehicle width direction.

2. A side-under spoiler supported by a vehicle body through a bracket provided at a lower side of the vehicle body, comprising:
    a side-under spoiler body supported at a lower part of the bracket by supporting sections of the bracket elongated in a front-to-rear direction of the vehicle body;
    one or more attaching sections for engaging said side-under spoiler body to said supporting sections; and
    one or more guides for guiding said attaching sections to said supporting sections,
    wherein each of said attaching sections further comprise a first engagement recess and a second engagement recess for engaging said supporting sections of said bracket, and
    wherein each of said attaching sections is formed with an abutting portion having a surface that matches a contour of the vehicle body.

3. The side-under spoiler according to claim 2, wherein each of said guides comprises a plane protruded rearwardly from a lower end of each of said attaching sections, in a vehicle width direction.

4. The side-under spoiler according to claim 2, wherein a joint between each of said guides and each of said attaching sections is curved.

5. The side-under spoiler according to claim 3, wherein a joint between each of said guides and each of said attaching sections is curved.

6. A side-under spoiler supported by a vehicle body through a bracket provided at a lower side of the vehicle body, comprising:

a side-under spoiler body supported at a lower part of the bracket by supporting sections of the bracket elongated in a front-to-rear direction of the vehicle body;

one or more attaching sections for engaging said side-under spoiler body to said supporting sections; and one or more guides for guiding said attaching sections to said supporting sections, wherein each of said attaching sections further comprise a first engagement recess and a second engagement recess for engaging said supporting sections of said bracket, wherein said first engagement recess is defined by a first regulation rib and a second regulation rib, said first regulation rib and said second regulation rib including a plane protruding frontwardly from each of said attaching sections, in a vehicle width direction, and wherein said second engagement recess is defined by a third regulation rib and said guide, said third regulation rib including a plane protruding rearwardly from each of said attaching sections, in a vehicle width direction.

* * * * *